US010409398B1

(12) United States Patent
Armas (10) Patent No.: US 10,409,398 B1
(45) Date of Patent: Sep. 10, 2019

(54) AIRCRAFT RAPID ACCESS DISPLAY SYSTEM, DEVICE, AND METHOD

(71) Applicant: Rockwell Collins, Inc., Cedar Rapids, IA (US)

(72) Inventor: Andrew Richard Armas, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 418 days.

(21) Appl. No.: 15/232,921

(22) Filed: Aug. 10, 2016

(51) Int. Cl.
*G06F 17/00* (2019.01)
*G06F 9/455* (2018.01)
*G06F 3/038* (2013.01)
*B64D 43/00* (2006.01)
*G06F 3/0481* (2013.01)

(52) U.S. Cl.
CPC .............. *G06F 3/038* (2013.01); *B64D 43/00* (2013.01); *G06F 3/0481* (2013.01); *G06F 3/04812* (2013.01)

(58) Field of Classification Search
CPC ...... B64D 43/00; G01C 23/00; G01C 23/005; G06F 3/0481; G06F 3/04817; G06F 3/0484; G06F 3/04847; G06F 3/1423; G06F 8/38; G06F 9/451; G06F 11/3013; G06F 11/302; G06F 11/3089; G06F 2203/04102; G06T 5/00; G08G 5/0021; G08G 5/0078; G09G 2340/04; G09G 2340/12; G09G 2340/125; G09G 2340/145; G09G 2354/00; G09G 2358/00; G09G 2370/022; G09G 2380/12;

(Continued)

(56) References Cited

U.S. PATENT DOCUMENTS 8,462,018 B1 * 6/2013 Shepherd ............... G01C 23/00
340/945
8,725,318 B1 * 5/2014 McCusker .............. H04L 67/12
701/3

(Continued)

OTHER PUBLICATIONS

Microsoft Windows 7 Auto-Hide the Taskbar (https://www.youtube.com/watch?v=01ZY20oKAio), Published on Mar 6, 2016. (Year: 2016).*

(Continued)

*Primary Examiner* — Thomas G Black
*Assistant Examiner* — Ce Li Li
(74) *Attorney, Agent, or Firm* — Daniel M. Barbieri; Donna P. Suchy; Angel N. Gerdzhikov (57) ABSTRACT

A system, device, and method for rapidly accessing a display of aircraft information are disclosed. The aircraft rapid access display system could include a input device for controlling a cursor; at least one aircraft system owning a user application (UA); and a display system including one or more definition files defining layer(s) and rapid access layer(s), a system configuration file, a display unit, and a processing module (PU) configured to communicate with the input device, each UA, and the display unit. The PU may be configured to acquire the definition file(s); acquire the system configuration file; monitor the movement of the cursor; generate an image data set representative of the cursor and one or more layer(s) and rapid access layer(s) as a function of the definition file(s), the system configuration file, and the movement of the cursor; and present the image on the display unit.

9 Claims, 8 Drawing Sheets

(58) Field of Classification Search
CPC .......... G09G 5/022; G09G 5/026; G09G 5/14; H04L 67/08; H04L 67/12
See application file for complete search history.

(56) References Cited

U.S. PATENT DOCUMENTS

| | | | |
|---|---|---|---|
| 8,788,125 B1* | 7/2014 | Lahr | G01C 23/005 |
| | | | 701/14 |
| 8,788,126 B1* | 7/2014 | Bull | G08G 5/0021 |
| | | | 701/14 |
| 9,060,010 B1* | 6/2015 | McCusker | H04L 67/12 |
| 2008/0195966 A1* | 8/2008 | Jean | G06F 3/0483 |
| | | | 715/781 |
| 2013/0179842 A1* | 7/2013 | Deleris | G06F 3/0484 |
| | | | 715/853 |
| 2015/0302827 A1* | 10/2015 | Danielsson | G01C 23/00 |
| | | | 345/581 |

OTHER PUBLICATIONS

"Cockpit Display System Interfaces to User Systems", Jul. 1, 2013, ARINC Specification 661-5, Aeronautical Radio, Inc., Annapolis, Maryland.

* cited by examiner

AIRCRAFT RAPID ACCESS DISPLAY SYSTEM, DEVICE, AND METHOD

BACKGROUND

Aircraft display units present the pilot with information pertaining to the aircraft. Because the operation of an aircraft depends on an interaction between many disparate systems, the amount of information presentable to the pilot is vast and, as such, cannot be presented on one screen. To facilitate the presentation of the disparate systems, an image presented on the entire screen may be divided into windows. When a cursor is included, the pilot has the potential to select one interactive graphical user interface (GUI) or widget from a number GUIs or widgets within a window to communicate with the aircraft system(s). Also, the pilot may have the option to change the information being displayed in each window. Sometimes, the display of information is only needed momentarily.

Aviation professionals have developed ARINC Specification 661 entitled "Cockpit Display System Interfaces to User Systems" (ARINC 661), an aviation industry standard known to those skilled in the art. ARINC 661 specifies a two-way communication method in which there is a dynamic exchange of blocks of data between a user application (UA) employed by an aircraft system and a cockpit display system (CDS). The UA may send requests to the CDS, and the CDS may send notifications to the UA upon receiving a widget event in response to a cursor's interaction with a widget; that is, an interaction with a widget results with a notification being sent. While ARINC 661 specifies a widget-event notification process to change the display of information, this process may be manually cumbersome when the pilot requires a momentary display.

SUMMARY

Embodiments of the inventive concepts disclosed herein are directed to a system, device, and method for rapidly accessing a display of aircraft information. The aircraft remote system may reduce a pilot's workload when accessing information that is currently not being viewed.

In one aspect, embodiments of the inventive concepts disclosed herein are directed to a system for rapidly accessing a display of aircraft information. The system could include a input device for controlling a cursor; at least one aircraft system owning a user application (UA); and a display system including one or more definition files defining layer(s) and rapid access layer(s), a system configuration file, a display unit, and a processing module (PU) configured for two-way communications with each UA and the display unit.

In a further aspect, embodiments of the inventive concepts disclosed herein are directed to a device for rapidly accessing a display of aircraft information. The device could include the PU configured to perform the method in the paragraph that follows.

In a further aspect, embodiments of the inventive concepts disclosed herein are directed to a method for rapidly accessing a display of aircraft information. When properly configured, the PU may acquire one or more definition files; acquire the system configuration file; monitor the movement of the cursor; generate an image data set representative of the cursor and one or more layers and rapid access layer(s) as a function of the definition file(s), the system configuration file, and the movement of the cursor; and present the image on the display unit.

DETAILED DESCRIPTION

In the following description, several specific details are presented to provide a thorough understanding of embodiments of the inventive concepts disclosed herein. One skilled in the relevant art will recognize, however, that embodiments of the inventive concepts disclosed herein can be practiced without one or more of the specific details, or in combination with other components, etc. In other instances, well-known implementations or operations are not shown or described in detail to avoid obscuring aspects of various embodiments of the inventive concepts disclosed herein.

Figure 1A:
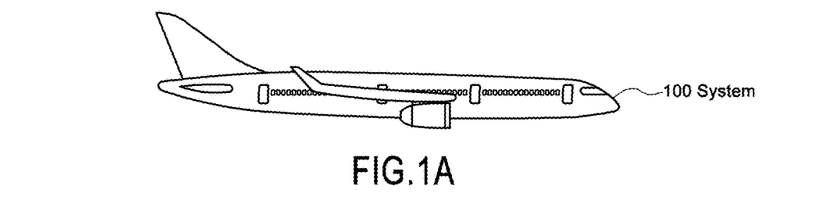
FIG. 1A depicts an aircraft configured with rapid access display system according to the inventive concepts disclosed herein.
Figure 1B:
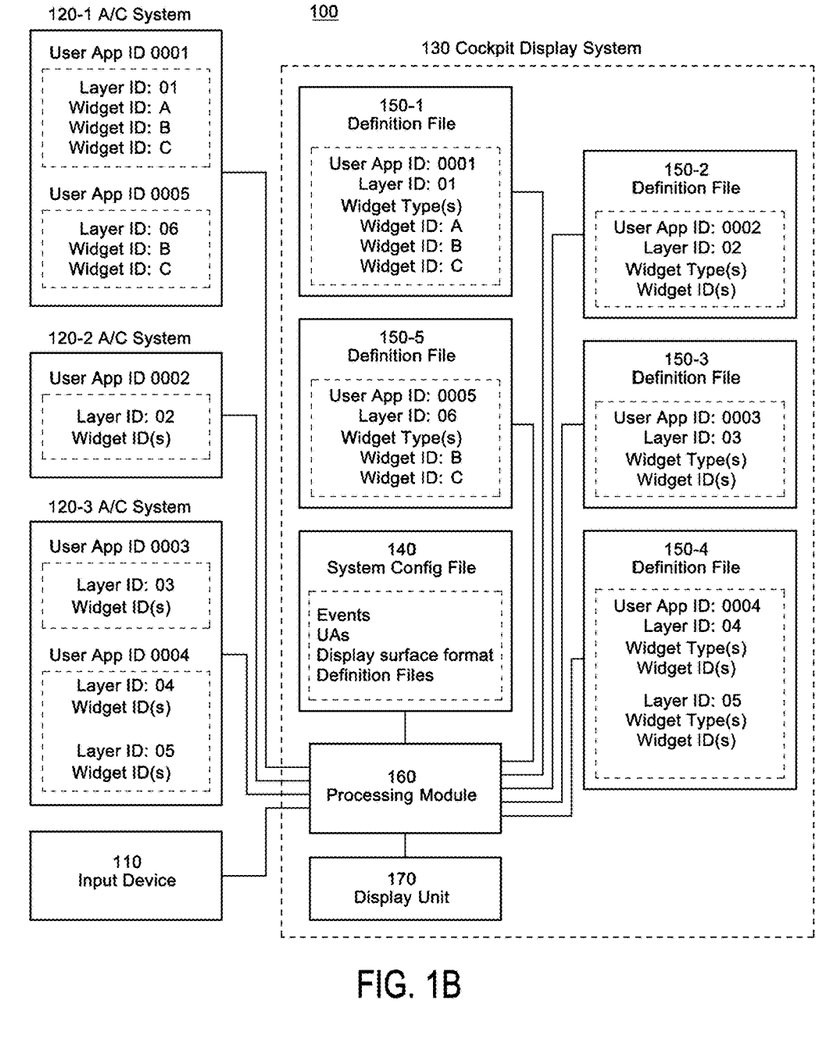
FIG. 1B depicts a functional block diagram of the rapid access display system of FIG. 1A.

Referring now to FIGS. 1A-1B an embodiment of an aircraft rapid access display system 100 suitable for implementation of the inventive concepts described herein includes a input device 110, a plurality of aircraft (A/C) systems 120, and a cockpit display system (CDS) 130 that includes a system configuration file (CF) 140, a plurality of definition files (DFs) 150, a processing module (PM) 160, and a display unit 170.

The input device 110 could include any tactile device (e.g., keyboard, control display unit, cursor control device (CCD), stylus, electronic grease pen, handheld device, touch screen device, notebook, tablet, electronic flight bag, or a user-wearable device). The input device 110 could be integrated with a display unit of the display system 170 where configured to receive pilot input (e.g., handheld device, touch screen device, notebook, tablet). In some embodiments, the input device 110 could include any voice input device that allows for a voice entry of data. In some embodiments, the input device 110 may provide data representative of a pilot's selection with a widget to the PM 160.

The plurality of A/C systems 120 could include any system installed in an aircraft in which a user application (UA) is installed. Types of A/C systems 120 may include, but are not limited to, air conditioning, auto flight, communications, electrical power, cockpit/cabin systems, fire protection, flight controls, fuel, hydraulic power, ice and rain protection, instruments, landing gear, lights, navigation, oxygen, pneumatic, vacuum, waste/water, central maintenance system, auxiliary power unit, propellers, main rotor, main rotor drive, tail rotor, tail rotor drive, rotors flight control, propeller/rotor systems, and powerplant systems. In some embodiments, the contents of each UA may be read by the PM 160 when the CDS 130 is initialized.

The UA(s) of each A/C system 120 and the system CF 140, the plurality of DFs 150, and/or the PM 160 discussed below in detail may be software components stored, permanently or temporarily, in a digital memory storage device or a non-transitory computer-readable media including, but not limited to, random access memory (RAM), read-only memory (ROM), compact disc (CD), hard disk drive, diskette, solid-state memory, Personal Computer Memory Card International Association card (PCMCIA card), secure digital cards, and compact flash cards. Although the system CF 140, the plurality of DFs 150, and the PM 160 are illustrated as being internal to the CDS 130, the storage devices storing any one of these may be external to the CDS 130 and used as an internal component of any other system of the aircraft.

Each A/C system 120 could own one or more UAs and layers therein, where each layer may be considered as the highest level entity known by each UA. As shown, an A/C system 120-1 owns UAs 0001 and 0005 and layers 01 and 06, respectively; an A/C system 120-2 owns UA 0002 and layer 02; and an A/C system 120-3 owns UA 0003 and layer 03 and UA 0004 and layers 04 and 05.

The UAs of remote aircraft system 120-1 may facilitate the dynamic exchange of blocks of data between the CDS 130 and remote aircraft systems 120-1, where exchange protocols have been published in ARINC Specification 661 entitled "Cockpit Display System Interfaces to User Systems" (ARINC 661), an aviation industry standard which is hereby and herein incorporated by reference in its entirety. In one direction of the dynamic exchange, UAs 0001 and 0005 of A/C system 120-1 may send real-time parameters measured and/or calculated by A/C system 120-1 to the CDS 130 as updated runtime parameters of one or more widgets of layers 01 and 06; UA 0002 of A/C system 120-2 may send real-time parameters measured and/or calculated by A/C system 120-2 to the CDS 130 as updated runtime parameters of one or more widgets of layer 02; and UAs 0003 and 0004 of A/C system 120-3 may send real-time parameters measured and/or calculated by A/C system 120-3 to the CDS 130 as updated runtime parameters of one or more widgets of layers 03, 04, and 05.

Also, UAs 0001 and 0005 may request changes to one or more layer properties of layers 01 and 06 such as, but not limited to, changes to layer visibility. Likewise, UA 0002 may request changes to one or more layer properties of layer 02; UA 0003 to one or more layer properties of layer 03; and UA 0004 to one or more layer properties of layers 04 and 05. In some embodiments, the PM 160 may receive the widget parameters and layer property requests sent by plurality of A/C systems 120.

In the other direction of the dynamic exchange, the CDS 130 may send notices of real-time events (e.g., events initiated by interactions between the input device 110 and widgets) to UAs 0001 and 0005 of NC system 120-1 as well as send notices of layer property changes such as, but not limited to, changes to layer activation. Likewise, the CDS 130 may send notices of real-time events and/or layer property changes to UA 0002 of A/C system 120-2 and UAs 0003 and 0004 of A/C system 120-3. In some embodiments, the PM 160 may send the widget events and layer properties to the plurality of A/C systems 120.

The system CF 140 may be used to configure the initial settings for the CDS 130. The system CF 140 may include instructions for establishing a communication link(s) with input device 110 for the subsequent receiving of input from a pilot's selection through widget interaction, where such input may trigger the PM 160 to recognize event associated with the pilot's selection. Also, the system CF 140 may include instructions or information related to the UAs of the plurality of A/C systems, the layers owned by the plurality of A/C systems 120, the configuration of a display surface format associated with the location of window(s) and the assignment of layer(s) to each window, and the loading and interpreting of the plurality of DFs 150. In some embodiments, the contents of the system CF 140 providing the initial settings for the CDS 130 may be loaded and interpreted by the PM 160 to begin an initialization process of the CDS 130.

The plurality of DFs 150 could describe a hierarchical structure of widgets assigned to layers, where the widget could be considered as a building block. Because the types and/or identification of widgets between layers could vastly differ, no specific widget type are shown in FIG. 1B; for the purpose of disclosing the inventive concepts herein, the characters A, B, and C of layers 01 and 06 will be used as widget identifications. Each widget could be defined by a set of parameters that control the graphical and/or interactive characteristics of that widget, where each parameter could be fixed or modified during runtime, i.e., a runtime parameter. Examples of widget parameters include, but are not limited to, visibility and enablement parameters. Also, each widget could have a graphical look that represents how the object will appear when it is drawn on the display surface of the display unit 170. As stated above, an interactive widget could be a GUI which provides a means for the pilot to interact with the CDS 130.

A widget could be grouped into one or more categories such as, but not limited to, the following: a container or logical widget (e.g., basic container, mutually exclusive container, radio box), a graphical representation widget (e.g., edit box text, graphical primitive ("GP") line, GP rectangle, label, push button, toggle button), a text string widget (edit box text, label, push button, toggle button), an interactive widget (e.g., edit box text, push button, toggle button), a map management widget (e.g., map grid, horizontal map, horizontal map source, horizontal map item list), a dynamic motion widget (e.g., GP line, GP rectangle, label), a utility widget (e.g., connector, cursor reference), and a UA validation widget (e.g., basic container, edit box text, horizontal map, horizontal map source, mutually exclusive container, push button, radio box, toggle button).

Each DF 150 could be defined by a single layer or a grouping of layers, where each layer could be defined by a single widget or a grouping of widgets. DFs 150-1, 150-2, 150-3, and 150-5 are defined by single layers 01, 02, 03, and 06, respectively. DF 150-4 is defined by a grouping of layers 04 and 05. As stated above, each DF 150 and each layer included therein could be owned by one UA. As shown, DFs 150-1 and 150-5 are owned by UAs 0001 and 0005, respectively; DF 150-2 is owned by UA 0002; DF 150-3 is owned by UA 0003; and DF 150-4 is owned by UA 0004. In some embodiments, the contents of the plurality of DFs 150 may be read by the PM 160 when the CDS 130 is initialized.

The PM 160 could include any electronic data processing unit which executes software or computer instruction code that could be stored, permanently or temporarily, in a digital memory storage device or a non-transitory computer-readable media including, but not limited to, random access memory (RAM), read-only memory (ROM), compact disc (CD), hard disk drive, diskette, solid-state memory, Personal Computer Memory Card International Association card (PC-MCIA card), secure digital cards, and compact flash cards. The PM 160 may be driven by the execution of software or computer instruction code containing algorithms developed for the specific functions embodied herein. The PM 160 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the PM 160 could also include more than one electronic data processing unit. In some embodiments, the PM 160 could be a processor(s) used by or in conjunction with any other system of the aircraft including, but not limited to, the input device 110, the plurality of A/C systems 120, the CDS 130, and the display unit 170.

In some embodiments, the terms "programmed" and "configured" are synonymous. The PM 160 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a bus, through a wireless network, or as a signal received and/or transmitted by the PM 160 via a physical or a virtual computer port. The PM 160 may be programmed or configured to execute the method discussed in detail below. The PM 160 may be programmed or configured to provide output data to various systems and/or units including, but not limited to, the display unit 170.

The display unit 170 may include one or more display units configured to present information visually to the pilot. The display unit could be part of an Electronic Flight Information System (EFIS) and could include, but is not limited to, a Primary Flight Display (PFD), Navigation Display (ND), Head-Up Display (HUD), Head-Down Display (HDD), Multi-Purpose Control Display Unit, Engine Indicating and Crew Alerting System, Electronic Centralized Aircraft Monitor, Multi-Function Display, Side Displays, Electronic Flight Bags, Portable Electronic Devices (e.g., laptops, smartphones, tablets), and/or userwearable devices such as wrist- and head-mounted devices). The display unit 170 may be configured to present one or more display(s) or image(s). In some embodiments, the terms "display" and "image" are interchangeable and treated synonymously.

The PM 160 may be programmed to own and manage one or more windows displayed on the surface of the display unit 170, where each window may be defined as a physical demarcation of space on the surface of the display unit 170. Such physical demarcation information may have been provided in the system CF 140 and read by the PM 160. The visibility of each window could be managed by the PM 160, wherein the appearance of widgets in each window may be based upon both layer properties and widget parameters.

Figure 2A:
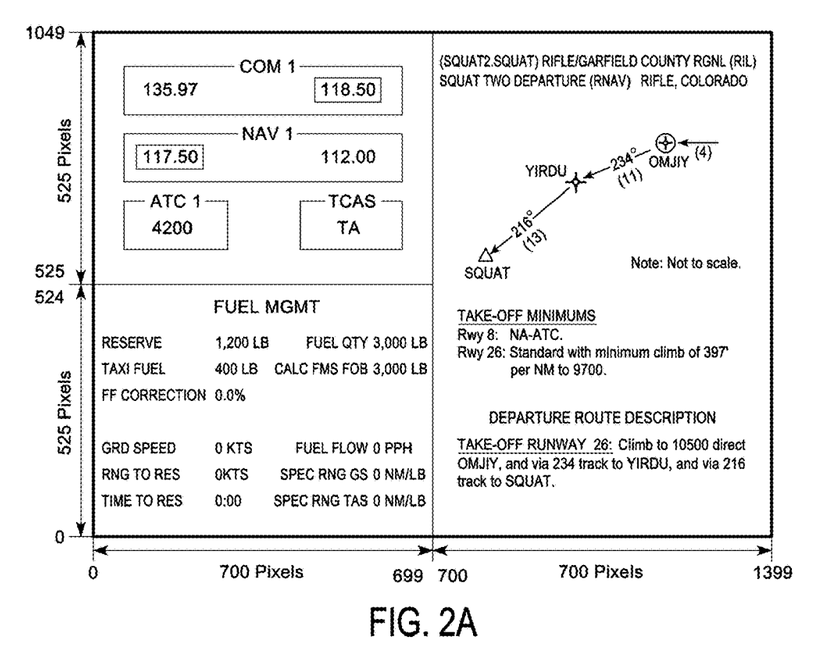
FIG. 2A presents an exemplary embodiment of aircraft information being presented on a display unit according to the inventive concepts disclosed herein.

Referring now to FIG. 2A, an exemplary image of aircraft information is presented on the display unit 170 having a surface area of 1400 by 1050 pixels. As configured, an image defined by three windows is illustrated. In the upper left-hand window, a plurality of widgets "A", "B", and "C" corresponding to frequency information of communication (COM 1) and navigation (NAV 1) systems, transponder information corresponding to an air traffic control (ATC 1) system, and alerting information of a traffic collision avoidance system (TCAS) is illustrated; for the purpose of illustration only and not of limitation, widgets "A" and "C" may be a "label" widget defined in ARINC 661, and widget "B" may be a "EditBoxText" widget. In the lower left-hand window, one or more widgets producing a fuel management (FUEL MGMT) system is illustrated. In the right-hand window, widgets producing a SQUAT2.SQUAT departure procedure for RIL is illustrated. For the purpose of illustration only and not of limitation, the widgets producing the images illustrated in the FUEL MGMT and SQUAT2.SQUAT windows have been intentionally omitted.

Figure 2B:
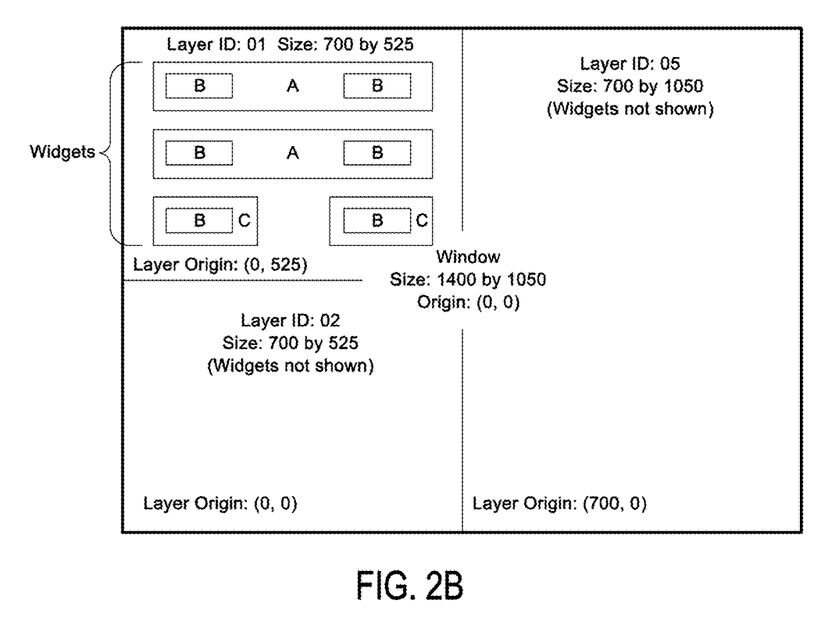
FIG. 2B depicts an exemplary embodiment of an exemplary display surface format that could be employed to produce the aircraft information of FIG. 2A according to the inventive concepts disclosed herein.
Figure 2C:
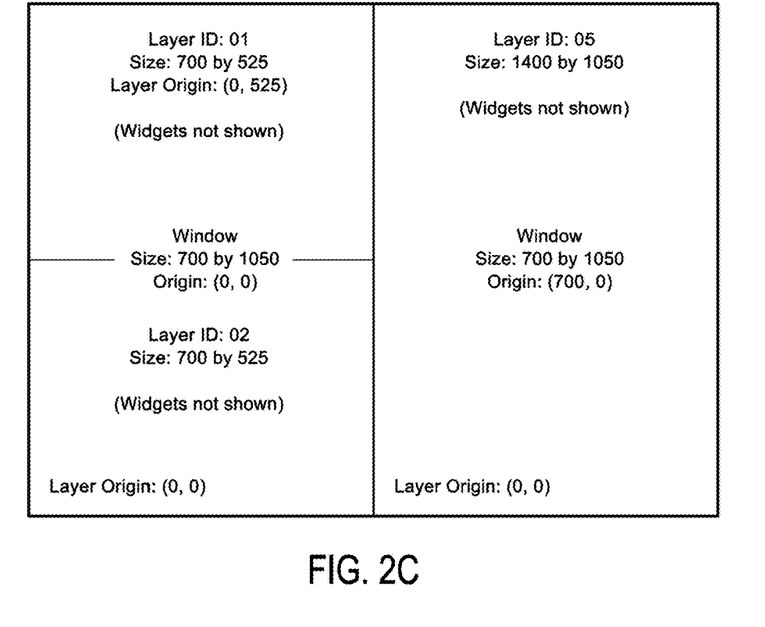
FIG. 2C depicts an exemplary embodiment of an exemplary display surface format that could be employed to produce the aircraft information of FIG. 2A according to the inventive concepts disclosed herein.
Figure 2D:
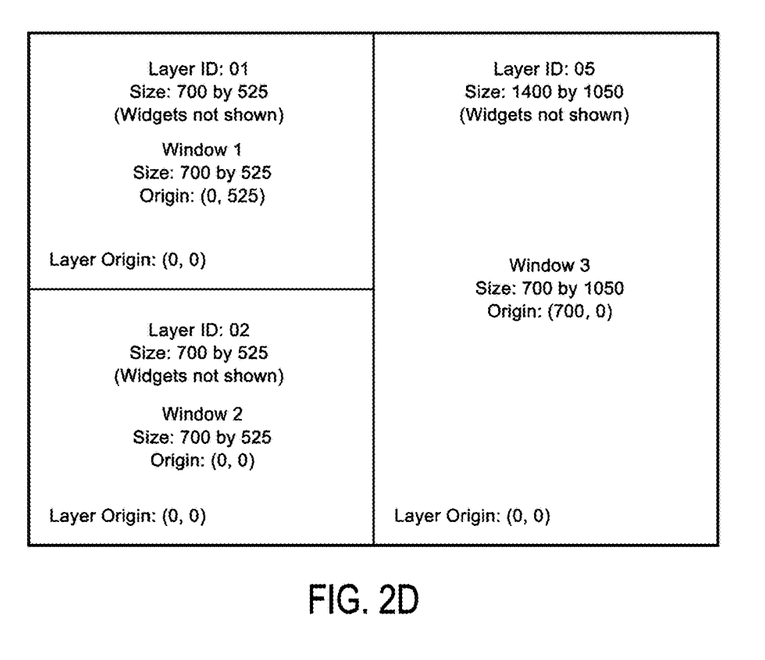
FIG. 2D depicts an exemplary embodiment of an exemplary display surface format that could be employed to produce the aircraft information of FIG. 2A according to the inventive concepts disclosed herein.

Referring now to FIGS. 2B through 2D, exemplary embodiments of three display surface formats that could be used to depict the aircraft information shown in FIG. 2A are illustrated, where the physical demarcation of space has created one or more windows defined by one or more layers. As shown in FIG. 2B, an exemplary display surface format is defined by a single window (depicted with thick borders). In this example, it is assumed that the single window originates from surface pixel location (0, 0) and has the size of 1400 by 1050 pixels. The window includes layers 01, 02, and 05 (depicted with thin borders). Layer 01 originates from window pixel location (0, 525) and has the size of 700 by 525 pixels; layer 02 originates from window pixel location (0, 0) and has the size of 700 by 525 pixels; and layer 05 originates from window pixel location (700, 0) and has the size of 700 by 1050 pixels; herein, window pixel locations are made in reference to the origin of the window.

Referring back to FIG. 1B, layers 01, 02, and 05 are owned by UAs 0001, 0002, and 0004, respectively; UA 0001 is owned by A/C system 120-1; UA 0002 is owned by A/C system 120-2; and UA 0004 is owned by A/C system 120-3. For the purpose of illustration only and not of limitation, the sizes of layers 01, 02, and 05 remain the same for the exemplary display surface formats of FIGS. 2C and 2D, and layer 04 has been intentionally omitted (layers 03 and 06 are discussed below).

Referring now to FIG. 2C, the exemplary display surface format illustrated is defined by two windows. In this example, it is assumed that window 1 originates from surface pixel location (0, 0) and has the size of 700 by 1050 pixels, and window 2 originates from surface pixel location (700, 0) and has the size of 700 by 1050 pixels. Window 1 includes layers 01 and 02, where layer 01 originates at pixel location (0, 525) of window 1, and layer 02 originates from pixel location (0, 0) of window 1. Window 2 includes layer 05, where layer 05 originates at pixel location (0, 0) of window 2.

Referring now to FIG. 2D, the exemplary display surface format shown is defined by three windows. In this example, it is assumed that window 1 originates from surface pixel location (0, 525) and has the size of 700 by 525 pixels, window 2 originates from surface pixel location (0, 0) and has the size of 700 by 525 pixels, and window 3 originates from surface pixel location (700, 0) and has the size of 700 by 1050 pixels. Window 1 is defined by layer 01, window 2 by layer 02, and window 3 by 05, where each layer originates at pixel location (0, 0) of its respective window.

To arrive at the image shown in FIG. 2A, the PM 160 could have established an image data set representative of the image by employing ARINC 661 protocols. For instance, the PM 160 could have set the layer activation property for each of the layers 01, 02, and 05 to the "on" position. After the PM 160 has sent notices of the activation to UA 0001 of A/C system 120-1, UA 0002 of A/C system 120-2, and UA 0004 of A/C system 120-3, the PM 160 could have received requests from each of them to set the visibility property of these layers to the "on" position.

Figure 3A:
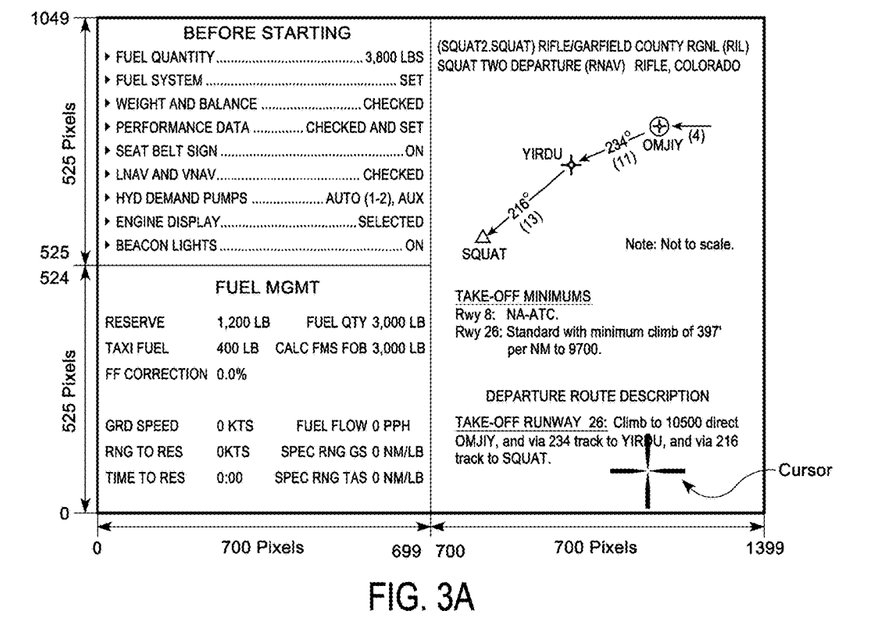
FIG. 3A presents an exemplary embodiment of a cursor and aircraft information being presented on a display unit according to the inventive concepts disclosed herein.

Some advantages and benefits of the inventive concepts disclosed herein are shown in FIGS. 3A through 3H, illustrating profiles of T/O paths that could be employed to automate T/O procedures. Referring now to FIG. 3A, an exemplary image of aircraft information similar to the information shown in FIG. 2A is presented on the display unit 160 along with a cursor. As configured, the image of FUEL MGMT is shown in the lower left-hand window, and the image of the SQUAT2.SQUAT departure procedure is shown in a right-hand window. In this configuration, an image of a BEFORE STARTING checklist defined by one or more widgets is presented instead of the image presenting COM 1, NAV 1, ATC 1, and TCAS information.

Figure 3B:
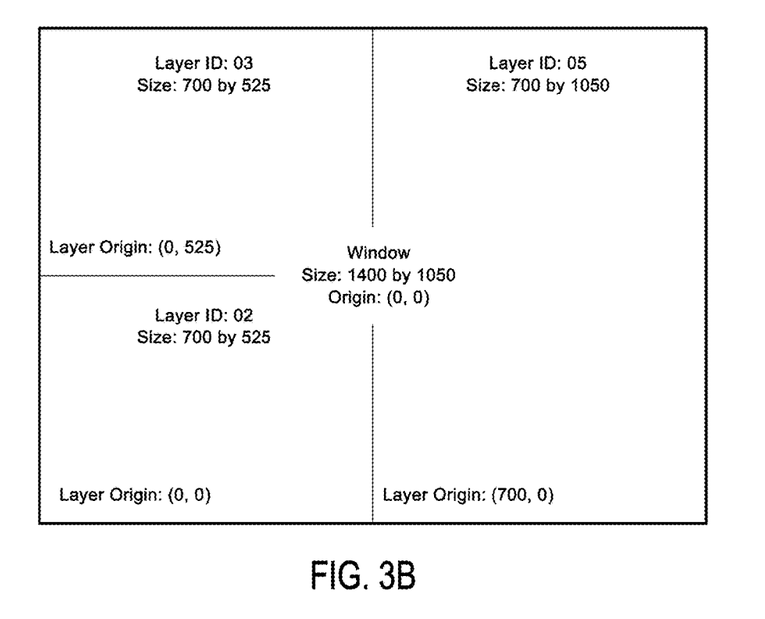
FIG. 3B depicts an exemplary embodiment of an exemplary display surface format that could be employed to produce the aircraft information of FIG. 3A according to the inventive concepts disclosed herein.

Referring now to FIG. 3B, an exemplary embodiment of an exemplary display surface format that could be used to depict the aircraft information shown in FIG. 3A is illustrated, where the physical demarcation of space has created one window defined by seven layers. In this example, it is assumed that the single window originates from surface pixel location (0, 0) and has the size of 1400 by 1050 pixels.

Figure 3C:
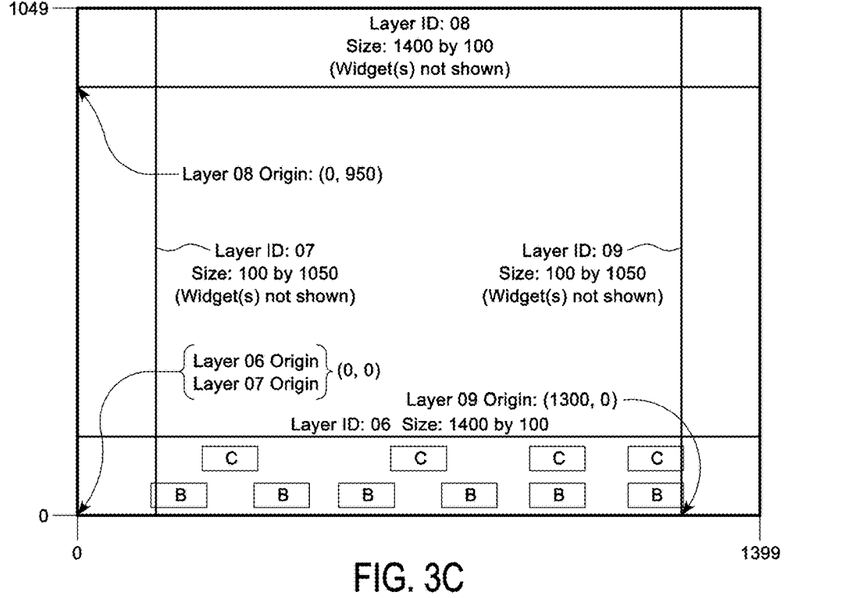
FIG. 3C depicts an exemplary embodiment of an exemplary display surface format that could be employed to produce a layer of aircraft information overlapping the aircraft information of FIG. 3A according to the inventive concepts disclosed herein.

As shown in FIGS. 3B and 3C, the window includes layers 02, 03, and 05 that are overlapped by layers 06 through 09 for providing the pilot with rapid access of visual information. Layer 02 originates from window pixel location (0, 0) and has the size of 700 by 525 pixels; layer 03 originates from window pixel location (0, 525) and has the size of 700 by 525 pixels; layer 05 originates from window pixel location (700, 0) and has the size of 700 by 1050 pixels; layer 06 originates from window pixel location (0, 0) and has the size of 1400 by 100 pixels; layer 07 originates from window pixel location (0, 0) and has the size of 100 by 1050 pixels; layer 08 originates from window pixel location (0, 950) and has the size of 1400 by 100 pixels; and layer 09 originates from window pixel location (1300, 0) and has the size of 100 by 1050 pixels.

Referring back to FIG. 1B, layers 02 is owned by UA 0002; layers 03 and 05 are owned by UA 0003; and layer 06 is owned by UA 0005. UA 0002 is owned by A/C system 120-2; UA 0003 is owned by A/C system 120-3; and UA 0005 is owned by A/C system 120-1 (which also owns UA 0001). For the purpose of illustration only and not of limitation, layers 07 through 09 and their respective UA(s) have been intentionally omitted.

To arrive at the image shown in FIG. 3A, the PM 160 could have established an image data set representative of the image by employing ARINC 661 protocols. For instance, the PM 160 could have set the layer activation property for each of the layers 02, 03, and 05 to the "on" position and the "off" position for each of the layers 06, 07, 08, and 09. After the PM 160 has sent notices of the activation to UAs 0002 and 0003, and notices of inactivation to UA 0005 and the owner UA(s) of layers 07 through 09, the PM 160 could have received requests from UAs 0002, 0003, and 0005 to set the visibility property of each of layers 02, 03, and 05 to the "on" position.

Figure 3D:
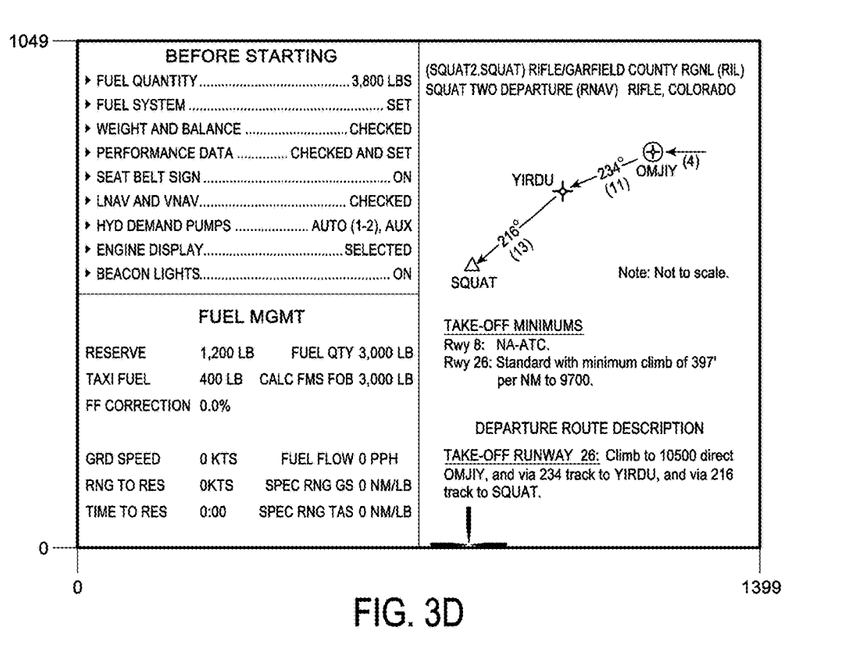
FIG. 3D presents an exemplary embodiment of the cursor and the aircraft information of FIG. 3A being presented on a display unit according to the inventive concepts disclosed herein.

Referring now to FIG. 3D, the image shown in FIG. 3A is presented, but the cursor has moved to the lower boundary of the display surface; here, the pilot could have moved the cursor via the input device 110 to its lowest possible location. The lower boundary of the display surface may be defined as (x, y(min)), where "y(min)" may be a y-pixel location equal to zero for any x-pixel location. In some embodiments, the PM 160 may be programmed to monitor the surface coordinates of the cursor's location.

When the cursor is located at the lower boundary of the display surface, the PM 160 may be programmed to set the layer activation property for the layer corresponding to the boundary to the "on" position; here, the PM 160 has been programmed to recognize a non-widget event and switch on a layer activation property without a pilot's interaction of selecting a widget. Because the lower boundary corresponds to rapid access layer 06, the PM 160 may set the layer activation property of rapid access layer 06 to the "on" position and send a notice of the activation to UA 0005. In response, the PM 160 could receive a request from UA 0005 to set the visibility of rapid access layer 06 to the "on" position.

Figure 3E:
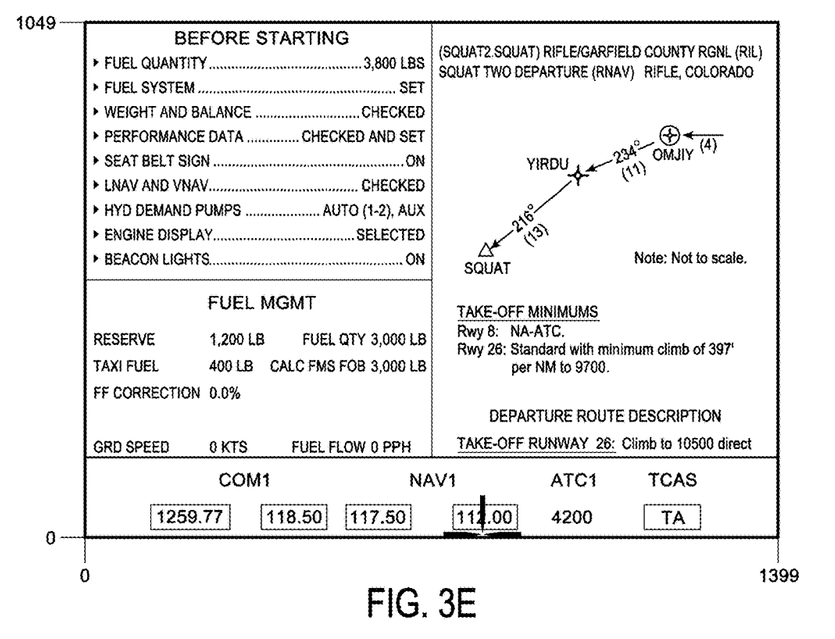
FIG. 3E presents an exemplary embodiment of the cursor and a layer of aircraft information overlapping the aircraft information of FIG. 3A being presented on a display unit according to the inventive concepts disclosed herein.

Referring now to FIG. 3E, rapid access layer 06 has become visible in response to receiving the request from UA 0005. As observed, the COM 1, NAV 1, ATC 1, and TCAS information presented in FIG. 2A and as defined by rapid access layer 06 comes into view.

Figure 3F:
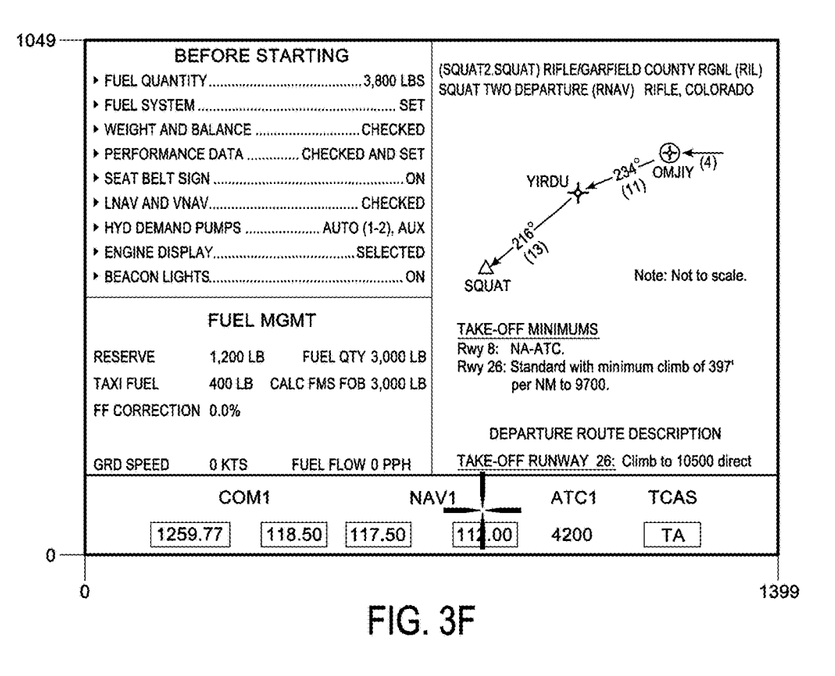
FIG. 3F presents an exemplary embodiment of the cursor and the layer of aircraft information overlapping the aircraft information of FIG. 3E being presented on a display unit according to the inventive concepts disclosed herein.

Referring now to FIG. 3F, the cursor of FIG. 3E has been moved upward from the lower boundary but remains within the rapid access layer 06; here, it is assumed that the location of the cursor is may be determined by the location of the center of the cursor. In some embodiments, the PM 160 may be programmed to determine whether the cursor is located within or at the boundaries of a rapid access layer that has been activated. From FIG. 3C, rapid access layer 06 has been defined by boundaries connecting the following pixel locations: (0, 0), (0, 99), (1399, 99), and (1399, 0). As shown in FIG. 3F, the location of the cursor falls within the boundaries; that is, the x-pixel location of the cursor is located between 0 and 1399, and the y-pixel location is located between 0 and 99. As such, the rapid access layer 06 may remain activated and visible.

Figure 3G:
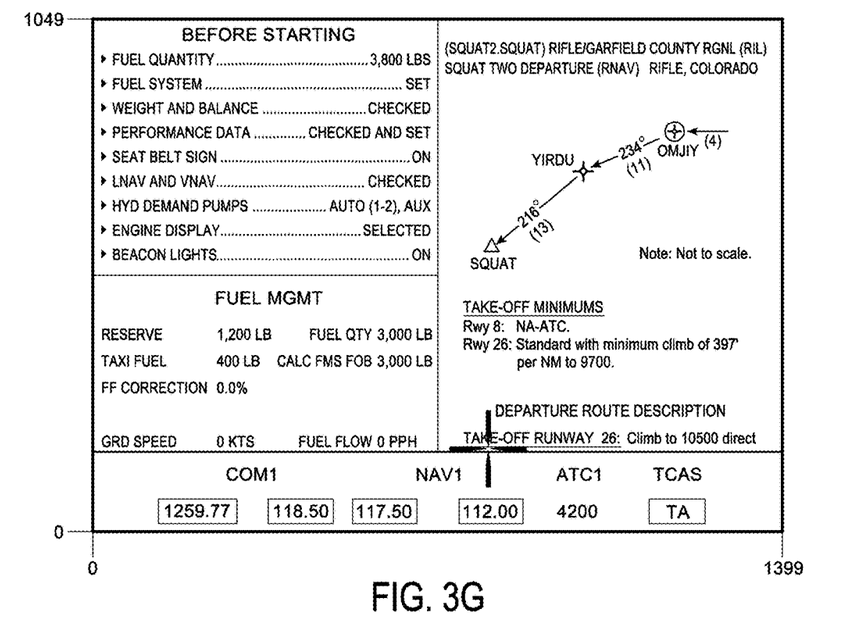
FIG. 3G presents an exemplary embodiment of the cursor and the layer of aircraft information overlapping the aircraft information of FIG. 3E being presented on a display unit according to the inventive concepts disclosed herein.
Figure 3H:
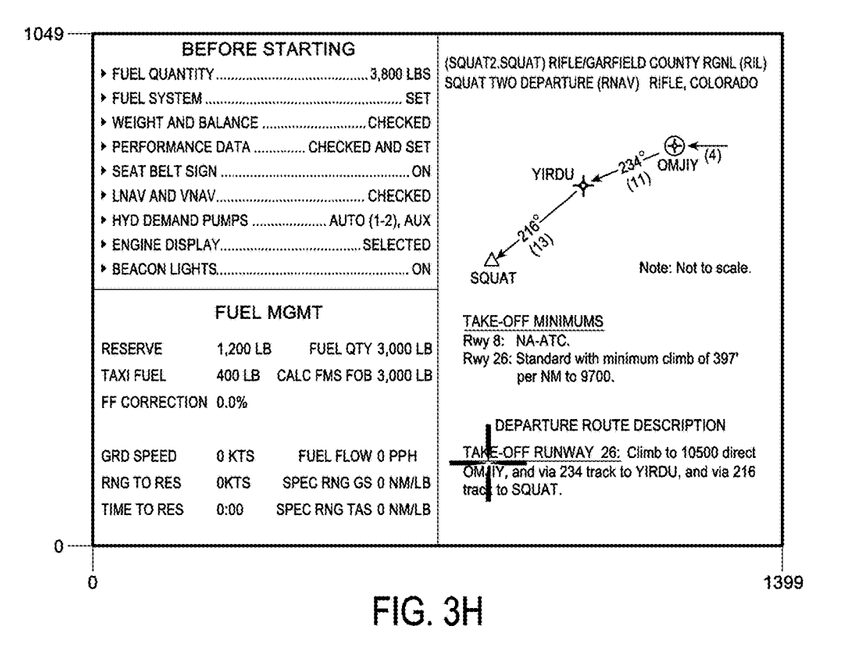
FIG. 3H presents an exemplary embodiment of the cursor and the aircraft information of FIG. 3A being presented on a display unit according to the inventive concepts disclosed herein.

Referring now to FIG. 3G, the cursor of FIG. 3F has been moved upward and is no longer located within or at the boundaries of rapid access layer 06; that is, the y-pixel location is greater than 99. In some embodiments, the PM 160 may be programmed to set the layer activation property to the "off" position when the cursor is located outside of an activated rapid access layer; here, the PM 160 has been programmed to recognize a non-widget event and switch off a layer activation property without a pilot's interaction of selecting a widget. After setting the layer activation property to the "off" position, the PM 160 may send a notice of inactivation to UA 0005. In response to the change of the layer activation property, rapid access layer 06 is no longer visible as shown in FIG. 3H.

Although the preceding discussion has been drawn towards the lower boundary of the display surface and its corresponding rapid access layer (layer 06), the inventive concepts disclosed herein are not limited to the lower boundary of the display surface. In some embodiments, the movement of the cursor to the left boundary of the display surface could result in its corresponding rapid access layer (layer 07) becoming visible and remaining visible while the cursor remains located with the layer. The left boundary may be defined as (x(min), y), where "x(min)" may be an x position equal to zero for any y-pixel location.

In some embodiments, the movement of the cursor to the top boundary of the display surface could result in its corresponding rapid access layer (layer 08) becoming visible and remaining visible while the cursor remains located with the layer. The top boundary may be defined as (x, y(max)), where "y(max)" may be a y position of the highest pixel row of the display surface (1049) for any x-pixel location. In some embodiments, the movement of the cursor to the right boundary of the display surface could result in its corresponding rapid access layer (layer 09) becoming visible and remaining visible while the cursor remains located with the layer. The right boundary may be defined as (x(max), y), where "x(max)" may be an x position of the rightmost pixel column (1399) for any y-pixel location.

Figure 4:
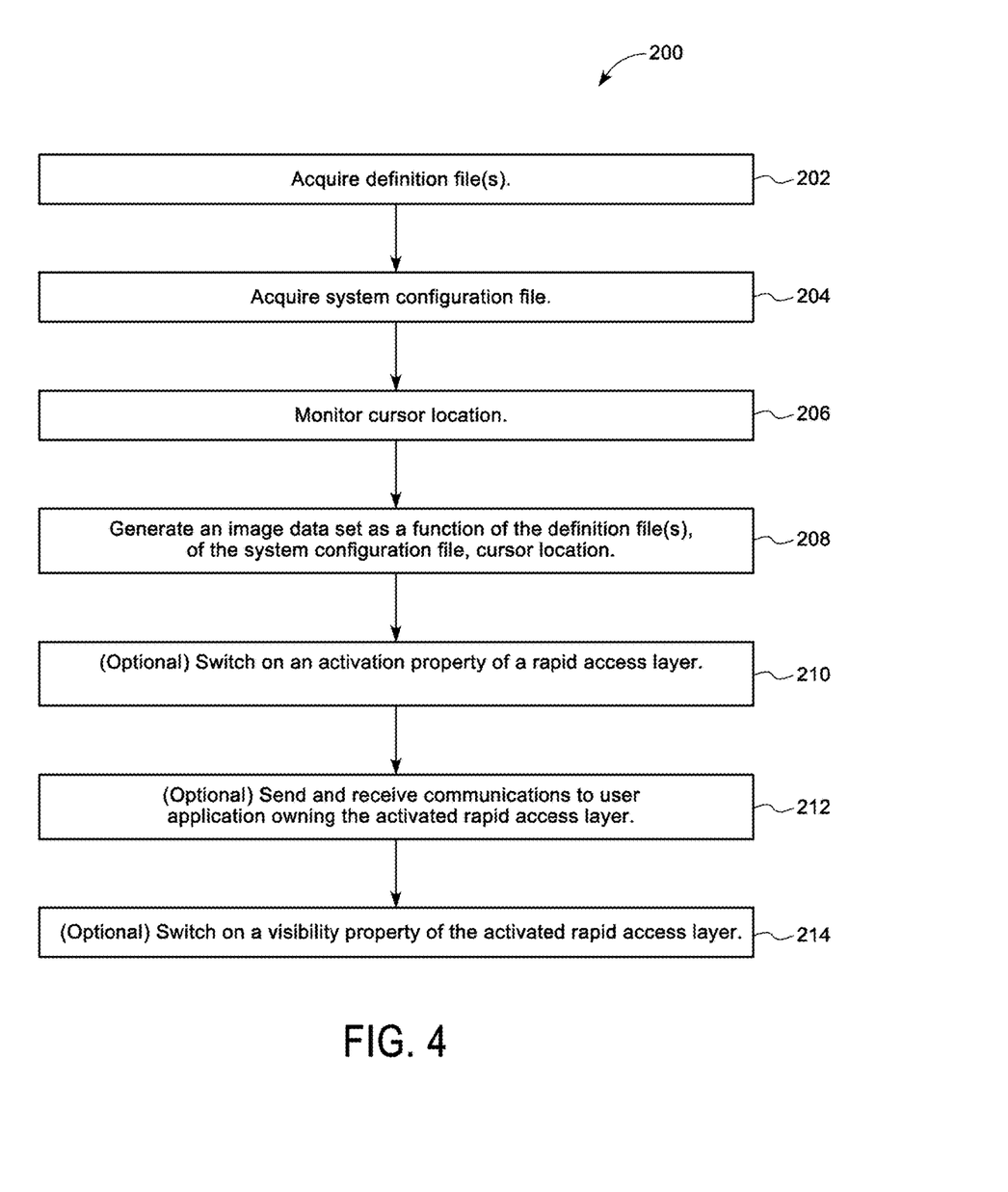
FIG. 4 depicts an exemplary embodiment of a flowchart disclosing a method for rapidly accessing a display of aircraft information according to the inventive concepts disclosed herein.

FIG. 4 depicts flowchart 200 disclosing an example of a method for rapidly accessing a display of aircraft information, where the PM 160 may be programmed or configured with instructions corresponding to the modules embodied in flowchart 200. In some embodiments, the PM 160 may be a processor or a combination of processors found in the display unit 170 or any other system suitable for performing the task. Also, the PM 160 may be a processor of a module such as, but not limited to, a printed circuit card having one or more input interfaces to facilitate the two-way data communications of the PM 160, i.e., the receiving and providing of data. As necessary for the accomplishment of the following modules embodied in flowchart 200, the acquiring of data is synonymous and/or interchangeable with the receiving and/or retrieving of data, and the providing of data is synonymous and/or interchangeable with the making available or supplying of data.

The method of flowchart 200 begins with module 202 with the PM 160 acquiring one or more DFs 150, where each DF 150 may be owned by the A/C system 120 or a UA of the A/C system 120. In some embodiments, each DF 150 may include one or more layers including one or more rapid access layers. In some embodiments, each layer may include a layer activation parameter having on and off positions. In some embodiments, each layer may include a layer visibility parameter having on and off positions. In some embodiments, each layer may be enclosed by a plurality of layer boundaries.

The method of flowchart 200 continues with module 204 with the PM 160 acquiring the system CF 140, where the system CF 140 may be comprised of data representative of one or more display system formats. In some embodiments, each display surface format may include of one or more windows. In some embodiments, each window may include one or more layers including one or more rapids access layers.

The method of flowchart 200 continues with module 206 with the PM 160 monitoring a location of a cursor. In some embodiments, the location of the cursor may be controlled through or via the input device 110.

The method of flowchart 200 continues with module 208 with the PM 160 generating an image data set representative of an image that includes the cursor and one or more first layers. In some embodiments, the image data set may be generated as a function of one or more DFs 150, the system CF 140, the location of the cursor, and one or more surface boundaries of the display surface of the display unit 170. In some embodiments, the image could include one or more rapid access layers when the location of the cursor coincides with a surface boundary. In some embodiments, the image data set may be provided to the display unit 170, where the image is presented to one or more viewers.

The method of flowchart 200 continues with optional module 210 with the PM 160 switching on the layer activation parameter of one or more rapid access layers to activate each of these layers. In some embodiments, the layer activation parameter(s) may be switched on with the cursor coincides with a surface boundary.

The method of flowchart 200 continues with optional module 212 with the PM 160 sending a communication to each UA owning an activated rapid access layer, notifying it of the activation. In return, the PM 160 may receive a communication from each UA requesting the PM 160 to switch on the layer visibility parameter of the activated rapid access layer.

The method of flowchart 200 continues with optional module 214 with the PM 160 switching on the visibility parameter of each activated rapid access layer in response to receiving the communication, enabling the rapid access layer to become visible to the viewer. In some embodiments, the layer activation parameter of a rapid access layer may be switched off with the cursor falls outside of or external to the rapid access layer. In some embodiments, the PM 160 may send a communication to each UA owing the deactivated rapid access layer, notifying it of the deactivation. In some embodiments, the PM may switch off the visibility parameter of each deactivated rapid access layer to remove it from view. Then, the method of flowchart 200 ends.

It should be noted that the steps of the method described above may be embodied in computer-readable media stored in a non-transitory computer-readable medium as computer instruction code. The method may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Further, steps not expressly disclosed or inherently present herein may be interspersed with or added to the steps described herein, or may be substituted for one or more of the steps described herein as will be appreciated by a person of ordinary skill in the art having the benefit of the instant disclosure.

As used herein, the term "embodiment" means an embodiment that serves to illustrate by way of example but not limitation.

It will be appreciated to those skilled in the art that the preceding examples and embodiments are exemplary and not limiting to the scope of the inventive concepts disclosed herein. It is intended that all modifications, permutations, enhancements, equivalents, and improvements thereto that are apparent to those skilled in the art upon a reading of the specification and a study of the drawings are included within the true spirit and scope of the inventive concepts disclosed herein. It is therefore intended that the following appended claims include all such modifications, permutations, enhancements, equivalents, and improvements falling within the true spirit and scope of the inventive concepts disclosed herein.

What is claimed is:

1. A system for rapidly accessing a display of aircraft information, comprising:
    an input device configured to control a location of a cursor;
    at least one aircraft system owning at least one user application;
    at least one definition file owned by the at least one aircraft system and comprised of at least one first layer with at least one pilot interactive widget and at least one second layer with at least one layer boundary of a plurality of layer boundaries coinciding with one surface boundary of a display, where
        each first layer and each second layer are comprised of:
            a layer activation parameter having on and off positions, and
            a layer visibility parameter having on and off positions;
    a system configuration file comprised of data representative of at least one display system format comprised of at least one window including the at least one first layer and the second layer, wherein
        the at least one user application, the at least one definition file, and the system configuration file conform to the requirements of ARINC 661; and
    the display configured to:
        receive an image data set representative of an image comprised of the cursor overlapping each image of the at least one first layer with its layer activation and visibility parameters set to their on positions and displayed in accordance with ARINC 661 order of visibility rules, where the image data set is provided by:
            a processing module of the cockpit display system including at least one processor coupled to a non-transitory processor-readable medium storing processor-executable code and configured to:
                acquire each definition file of the at least one definition file;
                acquire the system configuration file;
                monitor the location of the cursor; and
                generate the image data set as a function of:
                    the at least one definition file,
                    the system configuration file,
                    the location of the cursor, and
                    a layer boundary of the second layer;
                set, without any pilot interaction with any pilot interactive widget, the layer activation parameter of the second layer to the on position when the location of the cursor coincides with its layer boundary coinciding with the one surface boundary of the display;
                send, without any pilot interaction with any pilot interactive widget, a first communication to the user application owning the second layer with a notification of the activation parameter being set to the on position;
                receive a second communication from the user application owning the second layer in response to receiving the first communication; and
                set the layer visibility parameter of the second layer to the on position in response to receiving the second communication, whereupon
                    the image data set includes data representative of a visible image of the second layer overlapping at least a portion of the image of at least one first layer; and
            present the image represented in the image data set to a viewer.

2. The system of claim 1, wherein the processing module is further configured to:
    set, without any pilot interaction with any pilot interactive widget, the layer activation parameter of the second layer to the off position when it is set to the on position and the location of the cursor moves outside the plurality of boundaries forming the second layer, whereupon
        the data representative of the visible image of the second layer becomes absent from the image data set.

3. The system of claim 2, wherein
    the processing module is further configured to:
        send, without any pilot interaction with any pilot interactive widget, a first communication to the user application owning the second layer with a notification of the activation parameter being set to the off position;
        receive a second communication from the user application owning the second layer in response to receiving the first communication, and
        set the layer visibility parameter of the second layer to the off position in response to receiving the second communication.

4. A device for rapidly accessing a display of aircraft information, comprising:
    a processing module including at least one processor coupled to a non-transitory processor-readable medium storing processor-executable code and configured to:
        acquire at least one definition file owned by an aircraft system and comprised of at least one first layer with at least one pilot interactive widget and at least one second layer with at least one layer boundary of a plurality of layer boundaries coinciding with one surface boundary of a display, where
            each first layer and each second layer are comprised of:
                a layer activation parameter having on and off positions, and
                a layer visibility parameter having on and off positions;

acquire a system configuration file comprised of data representative of at least one display system format comprised of at least one window including the at least one first layer and the second layer, wherein
the at least one definition file, the system configuration file, and at least one user application owned by at least one aircraft system conform to the requirements of ARINC 661;
monitor a location of a cursor controlled through an input device and presented on the display configured with a plurality of surface boundaries; and
generate an image data set representative of an image comprised of the cursor overlapping each image of the at least one first layer with its layer activation and visibility parameters set to their on positions and displayed in accordance with ARINC 661 order of visibility rules, where the image data set is generated as a function of:
the at least one definition file,
the system configuration file,
the location of the cursor, and
a layer boundary of the second layer;
set, without any pilot interaction with any pilot interactive widget, the layer activation parameter of the second layer to the on position when the location of the cursor coincides with its layer boundary coinciding with the one surface boundary of the display;
send, without any pilot interaction with any pilot interactive widget, a first communication to the user application owning the second layer with a notification of the activation parameter being set to the on position;
receive a second communication from the user application owning the second layer in response to receiving the first communication; and
set the layer visibility parameter of the second layer to the on position in response to receiving the second communication, whereupon
the image data set includes data representative of a visible image of the second layer overlapping at least a portion of the image of at least one first layer; and
provide the image data set to the display, whereby the image represented in the image data set is presented to a viewer.

5. The device of claim 4, wherein
the processing module is further configured to:
set, without any pilot interaction with any pilot interactive widget, the layer activation parameter of the second layer to the off position when it is set to the on position and the location of the cursor moves outside the plurality of boundaries forming the second layer, whereupon
the data representative of the visible image of the second layer becomes absent from the image data set.

6. The device of claim 5, wherein
the processing module is further configured to:
send, without any pilot interaction with any pilot interactive widget, a first communication to the user application owning the second layer with a notification of the activation parameter being set to the off position;
receive a second communication from the user application owning the second layer in response to receiving the first communication; and
set the layer visibility parameter of the second layer to the off position in response to receiving the second communication.

7. A method for rapidly accessing a display of aircraft information, comprising:
acquiring, by at least one processor coupled to a non-transitory processor-readable medium storing processor-executable code, at least one definition file owned by an aircraft system and comprised of at least one first layer with at least one pilot interactive widget and at least one second layer with at least one layer boundary of a plurality of layer boundaries coinciding with one surface boundary of a display, where
each first layer and each second layer are comprised of:
a layer activation parameter having on and off positions, and
a layer visibility parameter having on and off positions;
acquiring a system configuration file comprised of data representative of at least one display system format comprised of at least one window including the at least one first layer and the second layer, wherein
the at least one definition file, the system configuration file, and at least one user application owned by at least one aircraft system conform to the requirements of ARINC 661;
monitoring a location of a cursor controlled through an input device and presented on the display configured with a plurality of surface boundaries; and
generating an image data set representative of an image comprised of the cursor overlapping each image of the at least one first layer with its layer activation and visibility parameters set to their on positions and displayed in accordance with ARINC 661 order of visibility rules, where the image data set is generated as a function of:
the at least one definition file,
the system configuration file,
the location of the cursor, and
a layer boundary of the second layer;
setting, without any pilot interaction with any pilot interactive widget, the layer activation parameter of the second layer to the on position when the location of the cursor coincides with its layer boundary coinciding with the one surface boundary of the display;
sending, without any pilot interaction with any pilot interactive widget, a first communication to the user application owning the second layer with a notification of the activation parameter being set to the on position;
receiving a second communication from the user application owning the second layer in response to receiving the first communication; and
setting the layer visibility parameter of the second layer to the on position in response to receiving the second communication, whereupon
the image data set includes data representative of a visible image of the second layer overlapping at least a portion of the image of at least one first layer; and
providing the image data set to the display, whereby the image represented in the image data set is presented to a viewer.

8. The method of claim 7, further comprising:
setting, without any pilot interaction with any pilot interactive widget, the layer activation parameter of the second layer to the off position when it is set to the on position and the location of the cursor moves outside the plurality of boundaries forming the second layer, whereupon
the data representative of the visible image of the second layer becomes absent from the image data set.

9. The method of claim 8, further comprising:

sending, without any pilot interaction with any pilot interactive widget, a first communication to the user application owning the second layer with a notification of the activation parameter being set to the off position;

receiving a second communication from the user application owning the second layer in response to receiving the first communication; and setting the layer visibility parameter of the second layer to the off position in response to receiving the second communication.

* * * * *